United States Patent
Tigges

(10) Patent No.: US 6,336,481 B1
(45) Date of Patent: Jan. 8, 2002

(54) UNIT FOR DEFLATING AND/OR INFLATING TIRES

(76) Inventor: Bertram Tigges, Gnadentaler Allee 14, Neuss (DE), D-41468

( * ) Notice: Subject to any disclaimer, the term of this patent is extended or adjusted under 35 U.S.C. 154(b) by 0 days.

(21) Appl. No.: 09/791,643

(22) Filed: Feb. 26, 2001

Related U.S. Application Data

(63) Continuation-in-part of application No. 09/421,564, filed on Oct. 20, 1999.

(30) Foreign Application Priority Data

Oct. 19, 2000 (EP) .......................................... 00 122 803

(51) Int. Cl.$^7$ ................................................ B65B 1/04
(52) U.S. Cl. .......................... 141/38; 152/415; 152/417
(58) Field of Search ........................... 141/38; 152/415, 152/416, 417; 137/223, 224, 227, 228

(56) References Cited

U.S. PATENT DOCUMENTS 3,335,766 A * 8/1967 Winger
5,839,801 A * 11/1998 Ferguson
6,144,295 A * 11/2000 Adams et al. .........................

* cited by examiner

*Primary Examiner*—Steven O. Douglas
(74) *Attorney, Agent, or Firm*—Liniak, Berenato, Longacre & White, LLC

(57) ABSTRACT

A unit (1) for deflating and/or inflating tires (42–49) has a regulating device (2) that has an air input (6) for connection to a compressed-air source (65) and at least one air output (8, 9) for connection to air-pressure lines (10, 11, 16, 17, 18–25). The regulating device (2) has a regulating member (67) with which a specific working pressure is implemented in the air-pressure lines (10, 11, 16, 17, 18–25) after connection to the tires. (42–49). The regulating member (67) is connected to a manually actuable adjusting device (57) with which different predetermined working pressures are established. The adjusting device (57) has at least two manually actuable switching members (59, 60, 61), each of which is associated with one of the different predetermined working pressures. Actuation of a switching member allows the regulating member (67) to be respectively adjusted to the respective predetermined working pressure associated with the switching member (59, 60, 61).

17 Claims, 3 Drawing Sheets

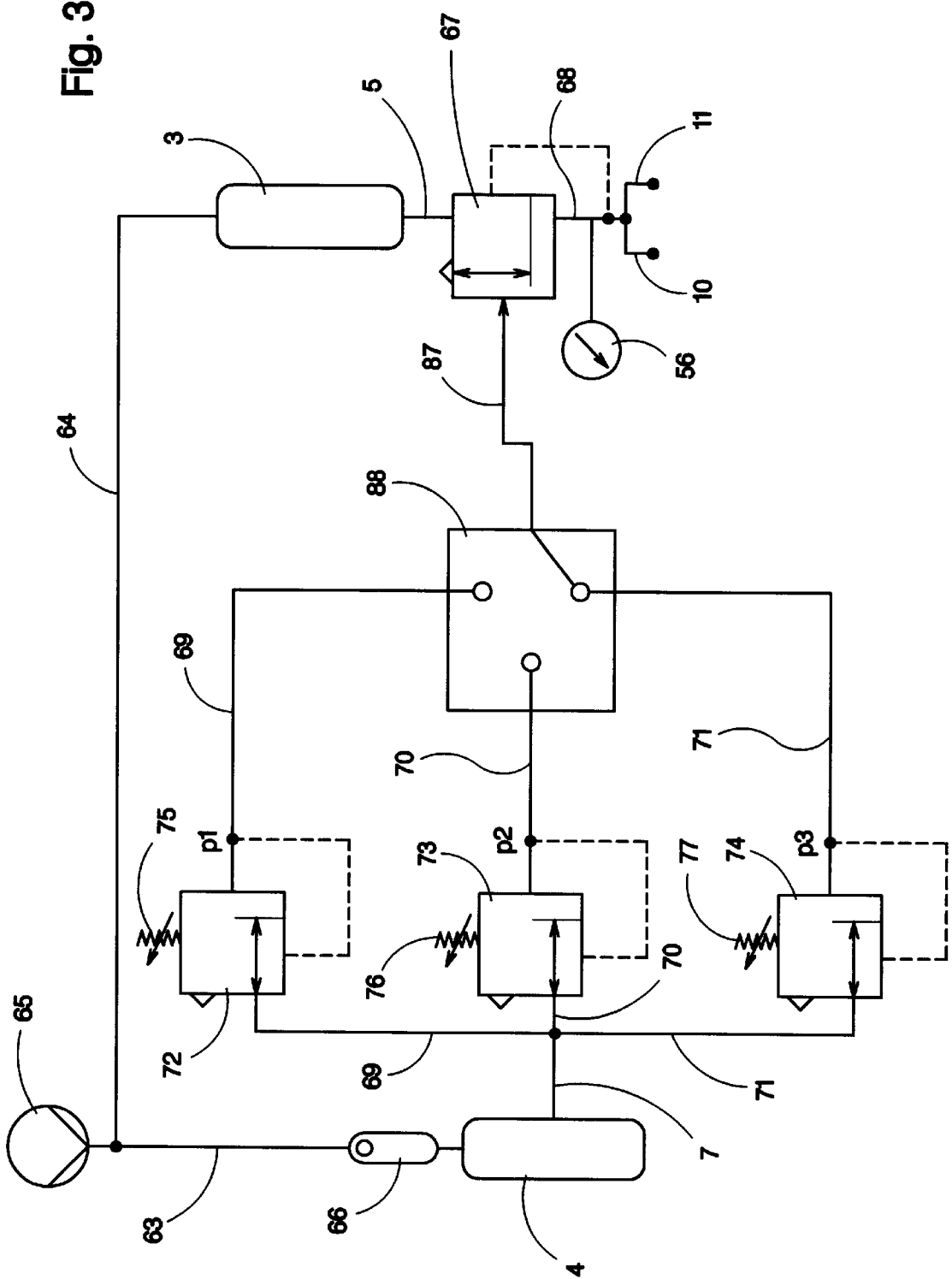

UNIT FOR DEFLATING AND/OR INFLATING TIRES

CROSS-REFERENCE TO RELATED APPLICATIONS

This is a continuation-in-part of application No. 09/421,564, filed Oct. 20, 1999, still pending.

The invention concerns a unit for deflating and/or inflating tires, in particular on off-road-capable vehicles, having a regulating device that has an air input connectable to a compressed-air source and an air output that can be connected via air-pressure lines to the tires, the regulating device having a regulating member with which a specific working pressure can be implemented in the air-pressure lines after connection to the tires, the regulating member being connected to a manually actuable adjusting device with which different working pressures can be established.

A unit of this kind is described in DE Utility Model 91 09 984.6. The unit is used, in particular on off-road-capable vehicles, to adapt the tire pressure to particular surface conditions. On paved roads, for example, the tires of such vehicles require a high pressure so that they do not heat up excessively at speeds in the vicinity of the maximum speed, and in order to ensure good road-holding. On unpaved roads and especially off-road, where the vehicle is driven slowly, lower tire pressures are advantageous because traction is thereby improved and the creation of deep tire tracks and severe surface compaction is prevented.

The aforesaid unit has a regulating device that has an air input which is connectable to a compressed-air source. Compressed-air sources of this kind are generally present in any case on large off-road-capable vehicles in order to actuate other devices, for example brakes. The regulating device has an air output that can be connected to a compressed-air line which are connectable, after branching, to the tire valves. The branched compressed-air lines are each stored in receiving containers in the vicinity of the tires, and for the inflation or deflation operation - when the vehicle is stationary—can be pulled out and connected to the valves.

The regulating device has a regulating member in the form of a proportional valve with which a specific working pressure can be established at the air output when the compressed-air lines are connected to the tire valves. Using a pneumatic adjusting device, various working pressures can be established in order to adapt the tire pressure to different driving surface conditions. For this purpose, the adjusting device has pressure valves that communicate with the compressed-air source and with which a specific control pressure can be applied to the proportional valve. The control pressure possesses a specific relationship to the working pressure, i.e. the working pressure is implemented by the proportional valve in accordance with the control pressure acting on it. The control pressure and thus the working pressure can be adjusted to various values by way of an adjusting member to be actuated from outside. The adjusting member is arranged on the exterior of the housing of the regulating device.

Although the known unit operates reliably, adjusting errors have occurred when the unit is operated. It has been found that despite the operating instructions and labeling on the adjusting member, incorrect tire pressures are often established; on the road, this can result in severe tire wear and even burst tires, and off-road it can produce poor traction and severe surface compaction.

It is therefore the object of the invention to configure a unit of the kind cited initially in such a way that the tire pressure optimal for the particular surface condition is established with greater reliability.

According to the present invention, this object is achieved in that the adjusting device has at least two, preferably three to six manually actuable switching members or a stepped switching member having at least two, preferably three to six switch positions, actuation of which allows the regulating member to be respectively adjusted to a working pressure associated with the switching member. The basic concept of the invention is thus to make available to the operator a separate switching member for each working pressure, so that the operator can establish the respective desired working pressure (and therefore tire pressure) by simply actuating the switching member provided therefor. The consideration underlying both solutions is the fact that generally only a few different working pressures are necessary for adaptation to the various surface conditions. Three different working pressures, and consequently three switching members or three switch positions of the stepped switching member for each working pressure, will normally be sufficient to adapt the tires to the various surface conditions.

Operation has proven to be very much more reliable, since it is now sufficient to briefly actuate one of the adjusting members or the stepped switching member. The switching members can be configured as simple two-point switches, for example as push switches, rotary switches, or rocker switches, while a rotary switch or slide switch is suitable for the stepped switching member. Corresponding labeling and/or colors can be used to ensure that the operator actuates the particular adjusting member, or brings the stepped switching member into that switch position, which brings about a working pressure corresponding to the particular surface conditions.

The stepped switching member can be connected to electropneumatically actuated valves. A particularly simple embodiment results, however, if the stepped switching member is coupled directly to a multiple-way valve.

The switching members or the stepped switching member can be arranged on the regulating device itself. Since the latter is usually arranged in the center of the vehicle in order to ensure short compressed-air lines to the tires, the regulating device is often not readily accessible, and in addition is more greatly subject to environmental influences such as dirt, etc. It has therefore proven advantageous to arrange the switching members or the stepped switching member on an adjusting unit, separated from the regulating device, that is connected to the regulating device via pneumatic or electrical control lines and thus can be mounted at any desired location on the vehicle. The driver's compartment is especially suitable for this purpose, since there the adjusting unit can be operated in convenient and well-protected fashion. Several identical and separate sets of switching members or several stepped switching members can, of course, also be present concurrently.

In a further embodiment of the invention, provision is made for an adjusting element to be present with which a working pressure of zero can be established. This is a further switching member that can be configured as an on/off switch. In the OFF position, the regulating member automatically vents the compressed-air lines so that rapid deflation of the tires can be performed, so as to transition in the shortest possible time, for example, from the high pressure for road operation to the substantially lower pressure for off-road use. The pressure is then set precisely to the predefined value by activating the adjusting element and actuating the switching member provided for off-road use, or setting the relevant switch position on the stepped switching member.

According to a further feature of the invention, provision is made for the regulating member to be pneumatically adjustable, for the adjusting device to have a pneumatic circuit in which each switching member or each switch position has associated with it a pneumatic pressure regulating valve for regulating a specific control pressure for the regulating member, and for the pressure regulating valves to be connected to an air-pressure reservoir. Suitable pressure regulating valves include precision valves with which the respective control pressure and thus also the working pressure at the output of the regulating device can be established very accurately. In order for the pressure of the air-pressure reservoir to be as constant as possible it should be protected with respect to the air-pressure source by way of a nonreturn valve. It is advantageous to associate a switching valve with each pressure regulating valve, and to connect the switching valves to the switching members or to the stepped switching member.

The regulating valve is advantageously configured in the regulating unit as a proportional valve. A separate pressure reservoir should be associated with it. Lastly, the invention provides for the working pressures associated with the switching members to be adjustable. This should be possible, however, only in such a way that the operator cannot easily make the adjustment. The adjustment should be performed only in a repair shop by a person authorized to do so, so that incorrect settings do not occur when changing pressures to adapt to different surface situations.

The invention is illustrated in more detail, with reference to an exemplary embodiment, in the drawings, in which:

FIG. 3 shows an electropneumatic circuit diagram of the regulating device of a unit differing from the one of FIGS. 1 and 2.

Figure 1:
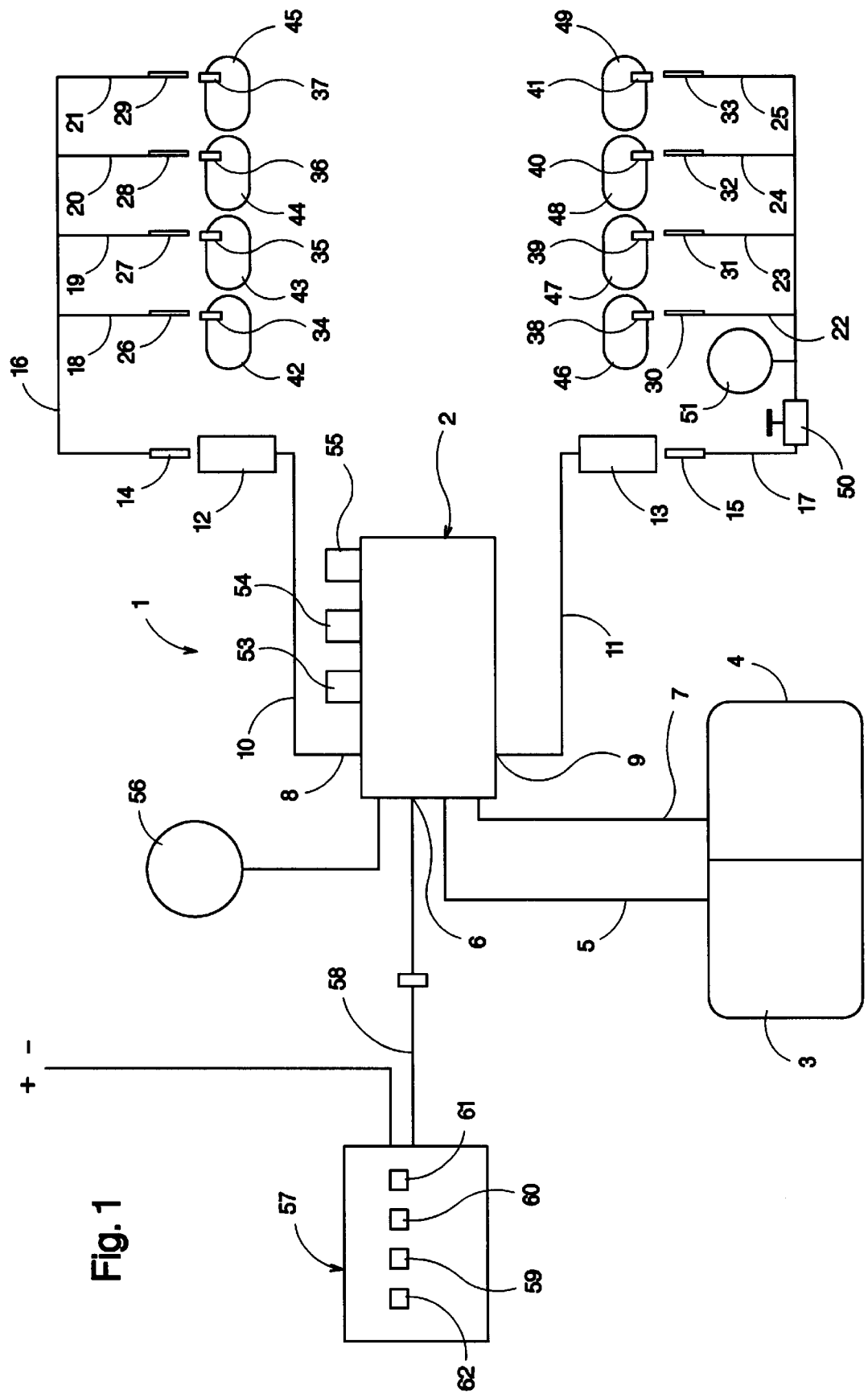
FIG. 1 shows a schematic depiction of the unit according to the present invention having a regulating device.

The unit for deflating and/or inflating tires, Labeled 1 in its entirety, has a regulating device 2 as a central unit. Associated with regulating device 2 are a working pressure reservoir 3 and a control pressure reservoir 4 that are supplied from a compressor shown only in FIG. 2. A working pressure line 5 leads from working pressure reservoir 3 to air input 6 on regulating device 2, while a control pressure line 7 leads from control pressure reservoir 4 also to regulating device 2.

Regulating device 2 has two air outputs 8, 9 to which air-pressure lines 10, 11 made of polyamide are connected. These, like regulating device 2, are immovably installed in a vehicle in such a way that they respectively terminate at one longitudinal side of the vehicle. Here they have quick-release couplings 12, 13. Flexible air-pressure lines 16, 17, which in this case each extend into four branches 18, 19, 20, 21 and 22, 23, 24, 25, can be connected to these quick-release couplings 12, 13 via matching connector pieces 14, 15. At their free ends, branch lines 18–25 have coupling pieces 26–33 that fit valves 34–41 on tires 42–49. Valves 34–41 can be connected to coupling pieces 26–33, thereby opening valves 34–41. A shutoff valve 50 is located in lower air-pressure line 17, and a manometer 51 is located on the valve side thereof. As a result of this arrangement, tires 42–45 can be given a pressure different from that of tires 46–49. Upper air-pressure line 16 can also be equipped with a shutoff valve and a manometer in the same arrangement.

Regulating device 2 has on its exterior 3 adjusting knobs 53, 54, 55 with which three different control pressures can be established. The particular control pressure that is established determines the air pressure in tires 42–49, monitoring being possible by way of an additional manometer 56.

Also present is an adjusting unit 57 that is connected to regulating device 2 via an electrical control cable 58. Adjusting unit 57 constitutes a kind of remote control, and can be arranged at any point on the vehicle, for example in the driver's compartment. Adjusting unit 57 has three actuation knobs 59, 60, 61 with which one of the three preset working pressures can be respectively switched. In addition, adjusting unit 57 has an on/off switch 62 with which the delivery of current to regulating device 2 can be interrupted. This interruption causes the working pressure to be established at zero, i.e. air-pressure lines 10, 11, 16, 17 and branch lines 18 through 25 are vented, and tires 42 through 49 can thus be quickly deflated.

Figure 2:
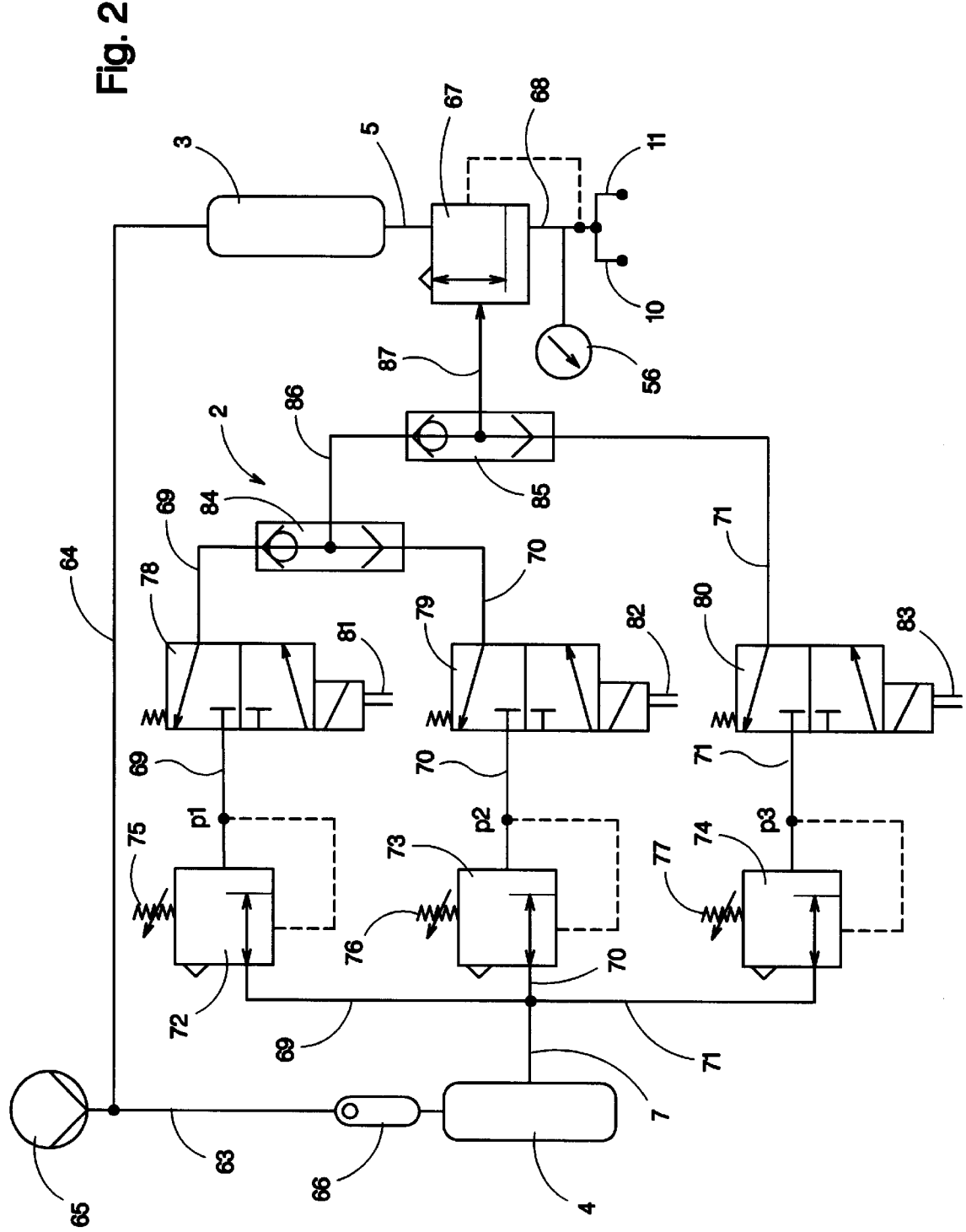
FIG. 2 shows an electropneumatic circuit diagram of the regulating device of the unit shown in FIG. 1.

The pneumatic circuit depicted in FIG. 2 explains the more detailed construction of regulating device 2. Working pressure reservoir 3 and control pressure reservoir 4 are in this case depicted separately, and are connected via delivery lines 63, 64 to compressor 65. Located in delivery line 64 to control pressure reservoir 4 is a nonreturn valve 66 that prevents any backflow of compressed air to compressor 65 and thus keeps the air pressure in control pressure reservoir 4 substantially constant, specifically at 10 bar.

Working pressure reservoir 3 is connected via a working pressure line 5 to a proportional valve 67 that is controlled by compressed air and establishes a specific working pressure depending on the applied control pressure. Connected to the output of proportional valve 67 is a working pressure line 68 that then branches into pressurized air lines 10, 11. The additional manometer 56 is connected to working pressure line 68. The control pressure for proportional valve 67 is adjusted using adjusting knobs 53, 54, 55. Control pressure line 7 proceeding from control pressure reservoir 4 splits, in regulating device 2, into branch lines 69, 70, 71 which each go to an input of a pressure regulating valve 72, 73, 74. These are precision valves that are connected by way of adjusting devices 75, 76, 77 to one of adjusting knobs 53, 54, 55 at which control pressures p1, p2, and p3 are established. Adjusting devices 75, 76, 77 can be set by authorized persons, using adjusting knobs 53, 54, 55, to the particular desired control pressure, which can be read off on manometer 56.

Branch lines 69, 70, 71 then continue and proceed to 3/2-way valves 78, 79, 80, which here are all in a closed state. By way of electrical inputs 81, 82, 83 and their associated relays, 3/2-way valves 78, 79, 80 can alternatively be brought into an open position. Inputs 81, 82, 83 are connected, via control cable 58, each to one of actuation knobs 59, 60, 61. The electrical circuit is constituted such that by actuation of one of actuation knobs 59, 60, 61, only a single 3/2-way valve 78, 79, 80 can in each case be brought into the open position, i.e. the others close automatically when a specific 3/2-way valve 78, 79, 80 is activated.

The two upper branch lines 68, 70 proceed from 3/2-way valves 78, 79 to a first OR element 84, while lower branch line 71 passes to a second OR element 85. Second OR element 85 also has an input for output line 86 coming from first OR element 84. A control line 87 leads from second OR element 85 to proportional valve 67.

FIG. 2 shows all the 3/2-way valves 78, 79, 80 in their closed positions. These positions result when on/off switch 62 is actuated to OFF. In this situation no control pressure is present at proportional valve 67, so that it establishes a working pressure of zero, i.e. tires 42 through 49 are also deflated toward zero bar and thus quickly lose air pressure. When on/off switch 62 is then switched to ON and actuation knob 61, for example, is pressed or rotated via adjusting unit 57, a control signal arrives at 3/2-way valve 80 connected thereto, with the result that the latter switches into the open position so that control pressure p3 present at 3/2-way valve 80 passes via second OR element 85 to proportional valve 67 and influences it in such a way that a working pressure corresponding to control pressure p3 is implemented. If a different working pressure needs to be established, actuation knob 60 acting on 3/2-way valve 79, or actuation knob 59 connected to 3/2-way valve 78, can be actuated. It is evident that OR elements 84, 85, by corresponding inhibition, prevent control air from emerging through 3/2-way valves 78, 79, 80.

It is understood that 3/2-way valves 78, 79, 80 can also be pneumatically actuated if a corresponding pneumatic circuit is provided between them and actuation knobs 59, 60, 61.

The exemplary embodiment depicted in FIG. 3 is largely similar to that in FIG. 2, for which reason the same reference numbers as in FIG. 2 have been used for identical parts. Reference is made to the description of FIG. 2 for descriptions of the parts labeled with such reference numbers.

FIG. 3 differs in that 3/2-way valves 78, 79, 80 and OR elements 84, 85, including output line 86, have been replaced by a pneumatic multiple-way valve 88 by way of which control line 87 can be connected to one of the three branch lines 69, 70, 71. Multiple-way valve 88 is actuated via a rotary switch (not depicted here). The rotary switch, together with multiple-way valve 88, is built into adjusting device 57, specifically instead of actuation knobs 59, 60, 61 as described in the exemplary embodiment depicted in FIGS. 1 and 2.

I claim:

1. A unit (1) for deflating and/or inflating tires (42–49), said unit having a regulating device (2) that has an air input (6) for connection to a compressed-air source (65) and at least one air output (8, 9) for connection to air-pressure lines (10, 11, 16, 17, 18–25), the regulating device (2) having a regulating member (67) with which a specific working pressure is implemented in the air-pressure lines (10, 11, 16, 17, 18–25) after connection to the tires (42–49), the regulating member (67) being connected to a manually actuable adjusting device (57) with which different predetermined working pressures are established, wherein the adjusting device (57) has at least two manually actuable switching members (59, 60, 61) each of which is associated with one of the different predetermined working pressures, actuation of a switching member allows the regulating member (67) to be respectively adjusted to the respective predetermined working pressure associated with the switching member (59, 60, 61).

2. The unit as defined in claim 1, wherein the switching members (59, 60, 61) are configured as two-point switches.

3. A unit (1) for deflating and/or inflating tires (42–49), said unit having a regulating device (2) that has an air input (6) for connection to a compressed-air source (65) and at least one air output (8, 9) for connection to air-pressure lines (10, 11, 16, 17, 18–25), the regulating device (2) having a regulating member (67) with which a specific working pressure is implemented in the air-pressure lines (10, 11, 16, 17, 18–25) after connection to the tires (42–49), the regulating member (67) being connected to a manually actuable adjusting device (88) with which different predetermined working pressures are established, wherein the adjusting device has a stepped switching member (88) having at least two switch positions, each position associated with one of the different predetermined working pressures, actuation of the stepped switching member into a switch position allows the regulating member (67) to be adjusted to the respective predetermined working pressure associated with the switch position.

4. The unit as defined in claim 3, wherein the stepped switching member (88) is configured as a rotary switch or slide switch.

5. The unit as defined in claim 3, wherein the stepped switching member is connected to a pneumatic multiple-way valve (88).

6. The unit as defined in claim 1, wherein the switching members (59, 60, 61) or the stepped switching member (88) are or is arranged on an adjusting unit (57), separated from the regulating device (2), that is connected to the regulating device (2) via a control line (58).

7. The unit as defined in one of claim 1, wherein an adjusting element (62) is present with which a working pressure of zero can be established.

8. The unit as defined in claim 7, wherein the adjusting device is configured such that when the adjusting device is switched off by the adjusting element (62), the regulating member (67) is automatically set to a working pressure of zero.

9. The unit as defined in claim 1, wherein the regulating member (67) is pneumatically adjustable, the adjusting device has a pneumatic circuit in which each switching member (59, 60, 61) or each switch position has associated with it a pneumatic pressure regulating valve (72, 73, 74) for regulating a specific control pressure for the regulating member (67), and the pressure regulating valves (72, 73, 74) are connected to an air-pressure reservoir (4).

10. The unit as defined in claim 9, wherein the air-pressure reservoir (4) is protected with respect to the air-pressure source (65) by way of a nonreturn valve (66).

11. The unit as defined in claim 9, wherein switching valves (78, 79, 80) that are connected to the switching members (59, 60, 61) or to the stepped switching member (88) are associated with each pressure regulating valve (72, 73, 74).

12. The unit as defined in claim 1, wherein the regulating member is configured as a proportional valve (67).

13. The unit as defined in claim 1, wherein the regulating member (67) has its own pressure reservoir (3) associated with it.

14. The unit as defined in claim 1, wherein the working pressures associated with the switching members (59, 60, 61) or the switch positions are adjustable.

15. A unit for adjusting air pressure in tires, comprising:
a regulating device having an inlet for operable connection to a compressed air source, an outlet for connection to an air line to a tire, and an associated adjustable regulating member for establishing a plurality of predetermined pressures in the air line; and
a plurality of switches operatively connected to said regulating member, each of said switches associated with a respective one of said predetermined pressures, actuation of said switches adjusts said regulating member to the associated pressure and thereby causes the associated pressure to be established.

16. A unit for adjusting air pressure in tires, comprising:
a regulating device having an inlet for operable connection to a compressed air source, an outlet for connection to an air line to a tire, and an associated adjustable regulating member for establishing a plurality of predetermined pressures in the air line; and
a switch operatively connected to said regulating member, said switch having at least two switch positions, each position associated with a respective one of said predetermined pressures, actuation of said switch into a switch position adjusts said regulating member and thereby establishes the associated pressure.

17. A method for adjusting air pressure in tires, comprising:

provising a regulating device having an inlet for operable connection to a compressed air source, an outlet for connection to an air line to a tire, and an associated adjustable regulating member for establishing a plurality of predetermined pressures in the air line;

providing a switching assembly operatively connected to the regulating member, the switching assembly having a plurality of settings, each setting associated with a respective one of the predetermined pressures; and actuating the switching assembly into a setting and thereby adjusting the regulating member to the pressure associated with the setting so that the associated pressure is established.

* * * * *